United States Patent [19]

Schwarz et al.

[11] Patent Number: 4,920,938
[45] Date of Patent: May 1, 1990

[54] GOVERNOR FOR FUEL INJECTION PUMPS

[75] Inventors: Manfred Schwarz, Gerlingen; Wolfgang Braun, Ditzingen; Carlos Alverez-Avila, Freiberg, all of Fed. Rep. of Germany

[73] Assignee: Robert Bosch GmbH, Stuttgart, Fed. Rep. of Germany

[21] Appl. No.: 280,806

[22] Filed: Dec. 7, 1988

[30] Foreign Application Priority Data

Dec. 18, 1987 [DE] Fed. Rep. of Germany ....... 3743060

[51] Int. Cl.$^5$ ............................................. F02M 39/00
[52] U.S. Cl. ................................. 123/373; 123/179 L; 123/449
[58] Field of Search .................... 123/373, 449, 179 L, 123/503

[56] References Cited

U.S. PATENT DOCUMENTS

| | | | |
|---|---|---|---|
| 3,974,812 | 8/1976 | Konrath | 123/373 |
| 4,253,438 | 3/1981 | Zibold | 123/179 L |
| 4,509,470 | 4/1985 | Ito | 123/179 L |
| 4,519,352 | 5/1985 | Eheim | 123/179 L |
| 4,612,891 | 9/1986 | Doveri | 123/373 |
| 4,615,317 | 10/1986 | Bofinger | 123/179 L |

FOREIGN PATENT DOCUMENTS 0032239 3/1978 Japan .................................. 123/373

Primary Examiner—Carl Stuart Miller
Attorney, Agent, or Firm—Edwin E. Greigg

[57] ABSTRACT

A governor for fuel injection pumps, said governor having two or three cooperating levers used to move a fuel injection quantity control slide. A regulating spring and the idling spring engage the drag lever. A start spring is disposed between the drag lever and the start lever, the start spring is opposed by the force of a flyweight assembly which is speed-dependent. When starting the combustion engine, the start lever, which is connected to the drag lever via a pivot pin, is in an initial position corresponding to a setting of the quantity control slide, which setting is smaller than the full injection quantity. When starting, the quantity control slide is displaced through a first control range to deliver a greater quantity of fuel, up to the full load injection quantities. Thereupon, when instituting a decrease, further displacement of the flyweight assembly results in the quantity control slide being displaced through a second control range in the direction of smaller quantities of fuel.

10 Claims, 2 Drawing Sheets

GOVERNOR FOR FUEL INJECTION PUMPS

BACKGROUND OF THE INVENTION

The invention pertains to a governor for fuel injection pumps. In fuel injection pumps of this type, an adjustable regulating spring contacts a one-armed bolt against a force that is dependent on speed. The bolt is connected to a starting lever that is coupled to a quantity control slide of the fuel injection pump. In a first control range, the starting lever is tipped a distance toward the drag lever by the speed-dependent force against the force of a starting spring that is supported against the drag lever, said distance being limited by a stop. In a second control range subsequent to the first, the starting and drag levers are tilted against the force of a regulating spring.

Due to the higher injection pressure that must be maintained in direct-injection engines, throttle losses are more noticeable as speed increases, throttle disproportionately large quantities of fuel are delivered for injection at lower speeds in order to achieve a full-load injection quantity at higher speeds. In such injection pumps, the high initial pressure in the injection lines results, first, in a trumpet-shaped decrease in injection quantity as speed increases, and second in a large starting quantity; however, this large quantity is not required for starting and consequently should be avoided for the sake of good burning and low noxious emissions.

OBJECT AND SUMMARY OF THE INVENTION

The object presented in the foregoing background of the invention is substantially attained in technologically simple fashion by the invention. Underlying the invention is the idea of shortening the travel of the regulating slide and consequently the associated end of feed at full load quantity within the travel of the regulating slide and of raising the travel of the slide to the full load quantity at the end of the starting process. This is advantageously attained by lowering the excessive injection quantity at low speeds in an injection pump of otherwise identical form.

Advantageous extensions are specified herein. The disclosure sets forth a simple construction for the governor, in which relatively small travel of the injection quantity element causes the short travel of the regulating slide from its starting position; this very small travel of the injection quantity setting element is amplified in the desired manner according to a value that is feasible within control technology.

BRIEF DESCRIPTION OF THE DRAWINGS

An exemplary embodiment of the invention is disclosed in the drawing and explained in the description of the figures.

DESCRIPTION OF THE PREFERRED EMBODIMENTS

Figure 1:
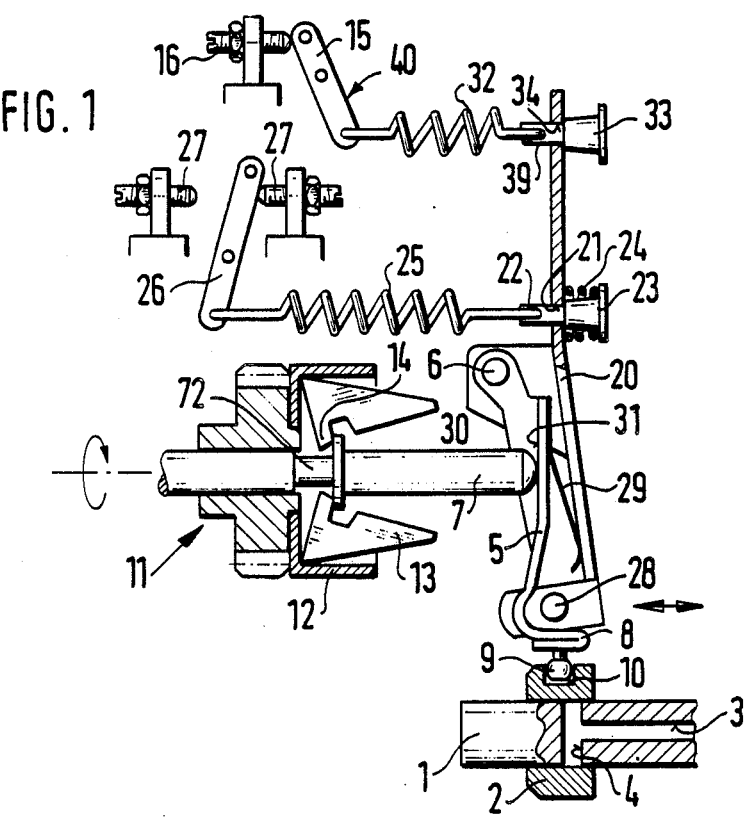
FIG. 1 shows working elements of the first exemplary embodiment of a governor.

The governor according to the invention, shown in FIG. 1, comprises a governor installed in a piston distributor injection pump. The fuel injection pump (not shown in greater detail) has a pump piston 1 defining a working space, not shown, said pump piston being displaced in known fashion in a reciprocating and simultaneously rotating motion by a cam plate (not shown), against the force of a resetting spring (likewise not shown), said cam plate being driven by operation of the combustion engine. A quantity control slide 2 embodied as a sliding cylindrical valve is disposed on the pump piston 1, said quantity control slide being movable in the longitudinal direction along the pump piston, which quantity control slide controls the opening of an outlet opening 4 of a relief duct 3 that communicates with the working space, depending on the position of the sliding cylindrical slide. The earlier or later timing of the opening thus determines the end of feed or, respectively, the quantity delivered by the pump piston 1 to a pressure line (not shown in greater detail). After opening, the fuel flowing out of opening 4 runs back into a suction chamber in which the slide control operates.

The axial position of the quantity control slide 2 respective to the position of the outlet opening 4 in the pump piston 1 is controlled by a one-armed start lever 5 of a governor installed in the suction chamber of the pump, said suction chamber serving to supply fuel to the working space. The governor comprises the start lever 5, a one-armed drag lever 20 that can pivot in the same plane as the start lever, a regulating spring 25 and an idling spring 32, both of which are articulated to the drag lever 20, and a flyweight assembly 11. The flyweight assembly 11 is driven by a rotating drive (not shown in greater detail) in proportion to the speed of the engine or the pump piston 1, respectively, and possesses a bracket 12 that receives flyweights 13 guided in pockets in a known manner, said flyweights having hornlike pressure projections 14 that contact drive ends of a longitudinally displaceable adjusting sleeve on a reduced diameter portion of 11. Other, e.g., hydraulic or pneumatic, adjusting members may be considered in lieu of the speed-dependent adjusting member, said other adjusting members engaging at the same contact point on the start lever 5.

The drag lever 20 is able to rotate around pivot pin 28 that is fixed with respect to the housing but is, however, adjustable by displacing it longitudinally on the pump piston, as indicated by the arrows. A pivot pin 6 is disposed on the drag lever 20 about which one end of the start lever 5 is articulated. This start lever 5 extends in the direction of the quantity control slide 2. The end 8 of the start lever 5 extending to the quantity control slide 2 has a spherical end 9 which engages a recess 10 in the quantity control slide 2. The end 8 of the start lever 5 is bent in order to guide it at a distance around the pivot pin 28 of the drag lever 20. When the start lever 5 is in the starting position, a standoff from pivot pin 28 permits the start lever 5 to move around the pivot pin against the force of a start spring 29 between the start lever 5 and drag lever 20 due to the effect of the displacement force of the flyweight assembly 11 until it stops against axle pivot pin 28. This motion up to pivot pin 28 is a first control range. The start spring is a leaf spring, one end of which is attached to the start lever 5 and the other end of which is supported against the drag lever 20. The drag lever 20, in the end region extending past axle 6, has a bore 21, through which a bolt 22 is inserted. An intermediate spring 24 is disposed between the head 23 of bolt 22 and the drag lever 20. One end of a regulating spring 25, embodied as a tension spring is connected to the end of bolt 22 extending below drag lever 20 while the other end of the regulating spring is hooked onto a lever 26 whose regulating travel is limited by spaced stops 27. Furthermore, one end of an idling spring 32 is connected to one end 39 of a connecting bolt 33 that extends through a recess 34 in drag lever 20. The other end of the idling spring 32 is hooked into an adjusting lever 40, said adjusting lever being embodied as a setting lever 15. The setting lever 15 is adjustable by means of a setscrew 16 to permit changing the pre-tension of the idling spring 32, which operates parallel to regulating spring 25.

In the first control range, the speed-dependent force of flyweight assembly 11 tilts the start lever 5 counterclockwise according to the view in FIG. 1, against the force of regulating spring 25, start spring 29, and idling spring 32, until start lever 5, contacts the pivot pin 28 of drag lever 20, which is embodied as a stop. In this position only start spring 29 is deformed. As the speed-dependent force increases further, start lever 5 and drag lever 20 tilt together clockwise around pivot pin 28 in a second control range. Joined to start lever 5 is end 9, which engages the quantity control slide 2. With start lever 5 in its initial position, quantity control slide 2 is set for a small delivery quantity, and is then displaced through the first control range to deliver a greater quantity of fuel, and thereupon, in the second control range, displaced to deliver smaller or equal quantities.

Figure 2:
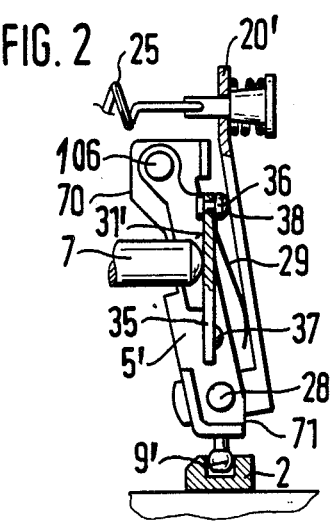
FIG. 2 shows a further embodiment.

In the second exemplary embodiment shown in FIG. 2, the parts corresponding to those in the first exemplary embodiment are indexed identically; slightly modified parts are indexed with the prime. This exemplary embodiment differs from that shown in FIG. 1 in having a differentiating lever arrangement. Here, too, the drag lever 20' can pivot around pivot pin 28. The drag lever 20' is shown cut off and this modification includes elements 15, 16, 32, 33, 34, 49 and 40, as shown in FIG. 1. Regulating spring 25 contacts drag lever 20'. Furthermore, start lever 5' is here embodied as a two-armed lever and likewise can pivot around pivot pin 28. The one arm 9' of start lever 5' contacts quantity control slide 2, while the other arm runs almost parallel to drag lever 20'. At the extreme end of this arm of start lever 5', a pivot pin 106 is articulated to an intermediate lever 35 which extends toward pivot pin 28 and which, lying between the start lever 5' and the drag lever 20' forms a stop for the adjusting sleeve 7. The intermediate lever 35 has a first stop 36 and a second stop 37, both of which are coordinated with drag lever 20; and between which adjusting sleeve 7 makes contact on the other side of intermediate lever 35. After its point of articulation with the pivot pin 106 of intermediate lever 35, first stop 36 is raised compared to a straight line connecting stop 37 and pivot pin 106, hence first stop 36 is situated ahead of drag lever 20'. When the sleeve 7 executes an adjusting motion, the start lever 5' first contacts the first stop 36, and only after a tilting movement around this first stop 36 does the drag lever contact the second stop 37, coming to rest against drag lever 20'. During this tilting motion, start lever 5' executes a counterclockwise pivoting motion away from drag lever 20'.

The first stop 36 is disposed on the angled contact surface 13' of start lever 5' and is embodied as a rivet, screw, or the like with a corresponding hemispheric rivet head to serve as a contact surface. Furthermore, in this exemplary embodiment, the start spring 29, embodied as a leaf spring here as well, is attached to the intermediate lever 35 in the vicinity of the first stop 36, the start spring attempting to pivot the intermediate lever 35 in the direction of the adjusting sleeve 7. Here, too, the start lever 5' and the intermediate lever 35 are initially in a position in which the quantity control slide 2 is set in such a way that a quantity of fuel less than the full load injection quantity is delivered. In the first control range, start lever 5', moved by the intermediate lever 35 against the quantity control slide 2, then pivots as described above to a delivery quantity setting corresponding to full load. In a second control range, a decrease from the full load fuel injection quantity is then again instituted.

Figure 3:
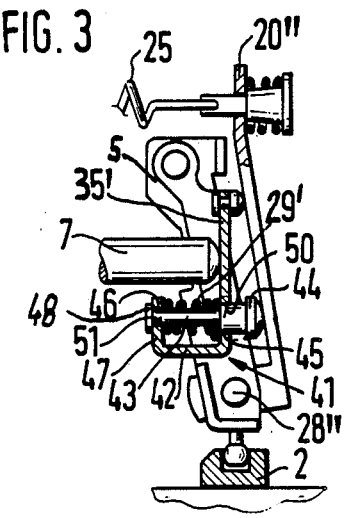
FIG. 3 shows a third embodiment.

FIG. 3 shows an expansion of the exemplary embodiment according to FIG. 2, in which the corresponding parts are indexed identically, while the modified parts are shown indexed with the prime. FIG. 3 shows that a U-shaped bent piece 42 is disposed at the end of the intermediate lever 35' in the direction of pivot pin 28''. In lieu of the second stop 37 in the embodiment shown in FIG. 2, here a stop bolt 43 with a stop head 44 is provided. The latter has a first bearing point 45 in a first bore 50 in the intermediate lever 35'' and a second bearing point 46 on the same axis as the first bore, in a second bore 51 in the opposing face 47 of the U-shaped bent piece 42. The opposite end of stop bolt 43 from the stop head has a stop 48, with which stop the bolt is kept in contact with the outside of face 47 by means of a start spring 29' embodied as a spiral spring. The spriral spring surrounds the stop bolt and is supported between the inside of face 47 and the stop head 44.

FIGS. 2 and 3 show modifications from FIG. 1 with an intermediate lever 35, by means of which finer adjustment of the "negative starting quantity" is possible, in particular by means of larger changes in the adjusting sleeve travel in conjunction with small changes in the quantity control organ. With the engine and flyweight assembly 11 stopped, start lever 5 is forced away from drag lever 20 by start spring 29 and the quantity control slide 2 is pushed into a position at which the desired "negative" starting quantity begins.

Figure 5:
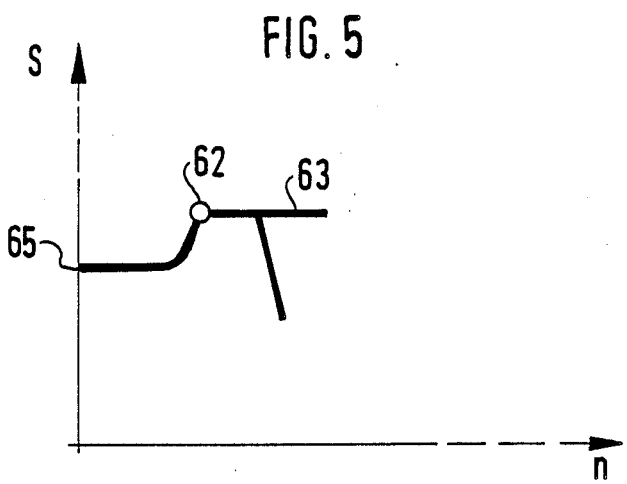
FIG. 5 shows an enlarged segment of the regulator characteristic of inset V in FIG. 4.

In the exemplary embodiment shown in FIG. 3, as speed increases after starting, the stop head 44 first contacts drag lever 20''. Drag lever 20'' is shown cut off and this modification includes the elements 15, 16, 32, 33, 34 and and 40; shown in FIG. 1. Subsequently, stop head 44 is pushed a little, if necessary, against the force of start spring 29' until it contacts the first stop 36, and as speed increases said stop head 44 is pushed further until it contacts the intermediate lever 35'. The intermediate lever here executes a counterclockwise tilting movement around the first stop 36 in a manner analogous to that of the intermediate lever in FIG. 2 and corresponding to the first control range. The change in travel, according to the invention, of quantity control slide 2 with a "negative starting quantity" is shown as solid line 61. The change in travel, according to the invention, of quantity control slide 2 with a "negative starting quantity" is again shown, magnified, in FIG. 5. When the distributor injection pump is stopped, the flyweights 13 are at rest and the adjusting sleeve 7 is at its lowest initial position. The start lever 5 and quantity control slide 2 alike are pressed by the start spring 29' into the start position corresponding to reference point 65 in FIG. 5. When the engine is started, the adjusting sleeve 7 of the flyweight assembly 11 moves against the start lever 5, which moves against the force of start spring 29'. During this initial movement of adjusting sleeve 7 of flyweight assembly 11, the drag lever 20" is held in place by regulating spring 25, so that the start lever 5 pivots around pivot pin 6. This pivoting movement of start lever 5 until it contacts pivot pin 28" of drag lever 20 corresponds to the first control range. With this pivoting motion of start lever 5, quantity control slide 2 moves to a greater fuel delivery quantity and at the end of this control range reaches its full load position, indicated by index 63 in FIG. 5, at which position the full load injection quantity is delivered by the pump piston. From contact onward, start lever 5 acts on pivot pin 28" like a two-armed lever, i.e., as adjusting sleeve 7 moves increasingly after start lever 5 contacts axle 28", start lever 5 moves quantity control slide 2 in the direction of decreasing delivery quantity, to institute the decrease in the fuel injection quantity starting from the full load curve 63, a decrease being instituted when the speed-dependent force set by the pre-tension of the control spring exceeds the force applied by the flyweight assembly.

Figure 4:
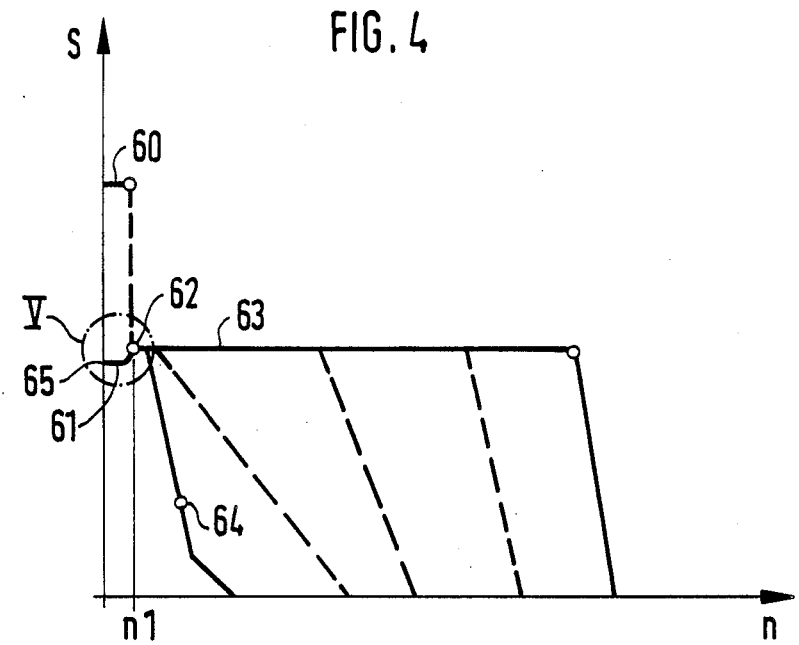
FIG. 4 shows the regulator characteristic for a multispeed governor.

FIG. 4 shows a functional diagram of this governor according to the invention, in which the abscissa shows pump speed in revolutions per minute and the ordinate shows the travel S of the quantity control slide 2. The fuel injection quantity curves for hither to known fuel injection pumps in the start phase have also been drawn in, with the dashed lines, with regulation in the diminishing direction from a high starting quantity corresponding to point 60 after starting to a full load quantity as shown by point 62.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A governor for a fuel injection pump of a combustion engine which comprises a one-armed drag lever (20) that pivots around a drag lever pivot pin (28), said drag lever (20) being contacted by a regulating spring (25) that is adjustable against a movable sleeve of a speed-dependent force, said governor including a start lever (5) coupled at one end to a quantity control slide (2) of the fuel injection pump, said starting lever (5) being moved, in a first control range, a distance toward the drag lever (20) in a direction of increasing fuel injection quantity by said sleeve of the speed-dependent force against the force of a start spring (29) that is supported against the drag lever (20), said distance being limited by a stop member, and said starting lever (5), in a second control range subsequent to the first, being disposed pivotably together with the drag lever (20) against the force of the regulating spring (25) in a direction of decreasing injection quantity, and as speed increases the start lever (5) is able to pivot in the first control range opposite the pivoting motion in the second control range due to movement of said sleeve of said speed dependent force.

2. A governor according to claim 1, in which said start lever (5) is a one-armed lever that is supported at one end on the drag lever (20) by means of pivot pin (6).

3. A governor according to claim 2, in which said start lever (5) has a part of the drag lever pivot pin (28) as said stop member.

4. A governor according to claim 1, in which said start lever (5') is a two-armed lever that pivots around a pivot pin (28), said start lever (5') includes a first arm (71) which is connected to the quantity control slide (2) and a second lever arm (70), said second lever arm supports a one-armed, intermediate lever (35) extending toward a drag lever pivot pin (28), said intermediate lever pivots around a pivot pin (106) disposed in the start lever (5'), said intermediate lever (35) being contacted by said movable sleeve of said speed-dependent force and the start spring (29) supported on the drag lever (20), and said start lever (5') includes a first stop (36) that contacts the drag lever (20), said first stop being situated ahead of the start spring (29) in the direction of pivot, and said start lever (5') includes a second stop (37) that serves as said stop member and being situated to limit the first control range after the first stop contacts the drag lever (20).

5. A governor according to claim 4, in which said first stop (36) lies between pivot pin (106) of the intermediate lever (35) and a point of contact of the movable sleeve of the speed-dependent force, wherein the point of contact of said movable sleeve lies between the first stop (36) and the second stop (37).

6. A governor according to claim 4, in which said second stop (37) is pre-tensioned by said start spring (29') and is displaceable by a preset distance on the intermediate lever, said first stop (44) being supported against the intermediate lever (35), on the one hand, and against the drag lever (20"), on the other.

7. A governor according to claim 5, in which said second stop (37) is pre-tensioned by said start spring (29') and is displaceable by a preset distance on the intermediate lever, said first stop (44) being supported against the intermediate lever (35), on the one hand, and against the drag lever (20"), on the other.

8. A governor according to claim 6, in which said start spring (29') is a coil spring.

9. A governor according to claim 7, in which said start spring (29') is a coil spring.

10. A governor according to claim 1, which includes an idling spring (32) that makes contact with the drag lever (20), on the one hand, and is attached, on the other hand, to an adjustable lever (15), said idling spring (32) being parallel to said regulating spring (25), and an intermediate spring (24) is disposed in line with said regulating spring (25), said intermediate spring (24) being supported between the drag lever (20) and one end of the main regulating spring (25).

* * * * *